Sept. 26, 1950   N. E. HART ET AL   2,523,429
STABILIZER FOR WEIGHING SCALE PIVOTAL CONNECTIONS
Filed Aug. 28, 1947   2 Sheets-Sheet 1
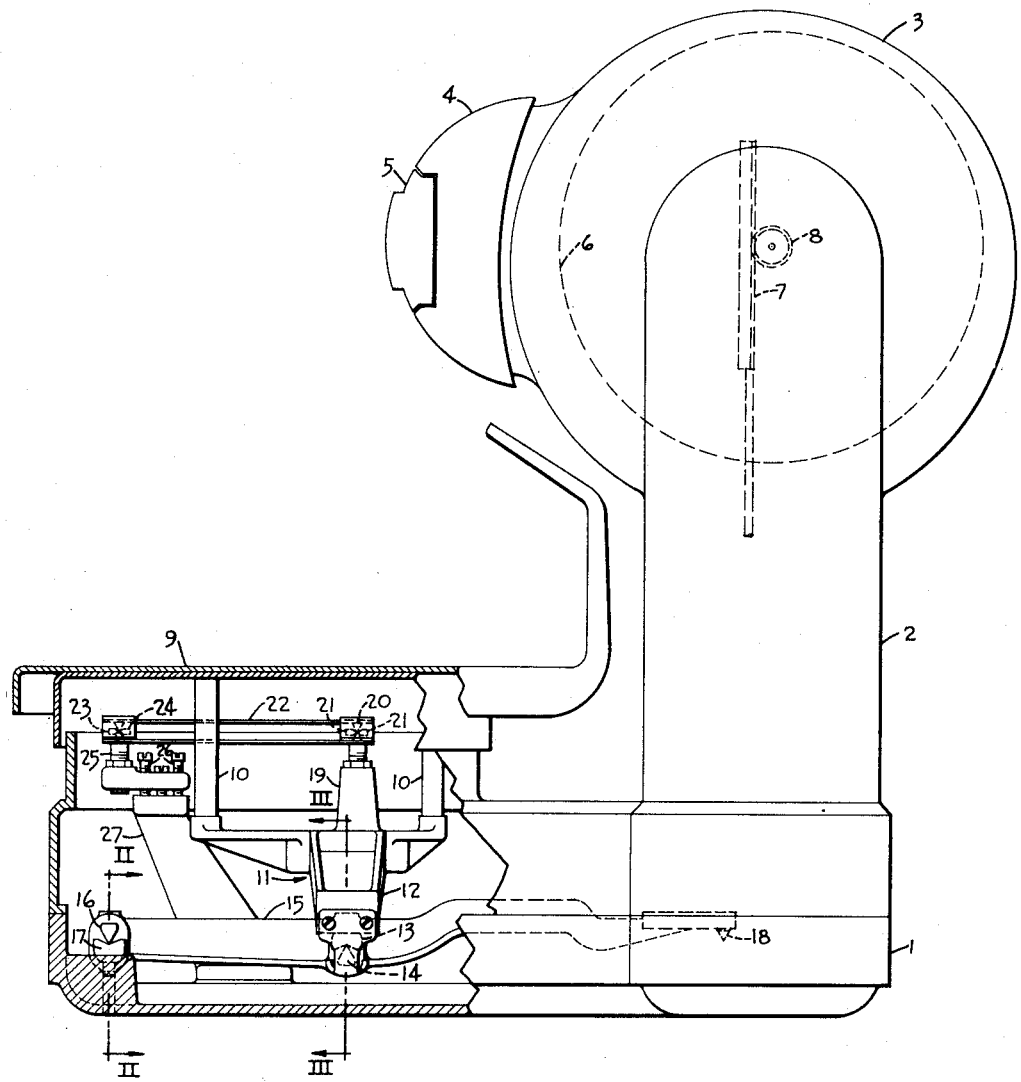
Fig. I
INVENTORS
Norman E. Hart
William A. Guss
BY
Marshall and Marshall
ATTORNEYS

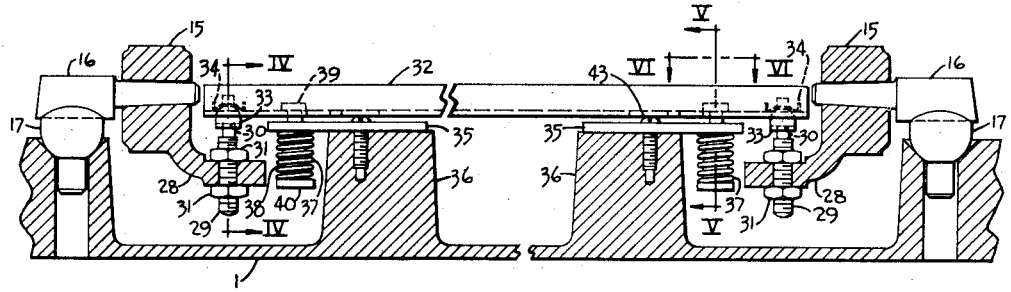
*Fig. II*
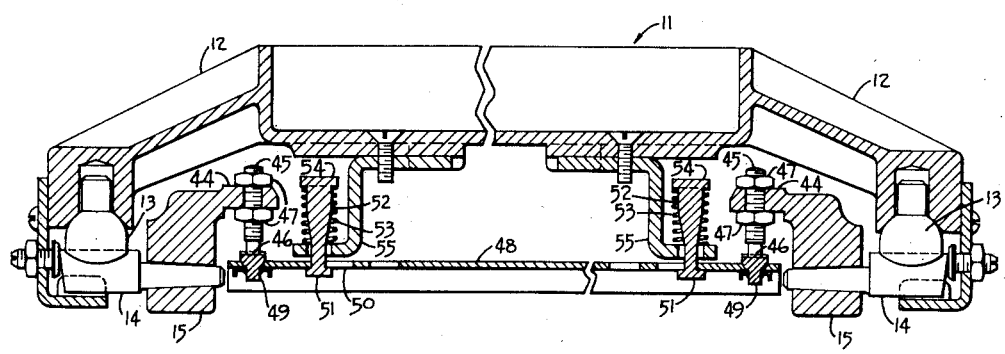
*Fig III*
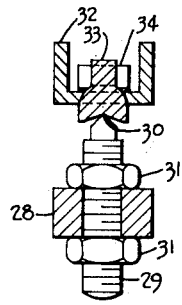
*Fig. IV*
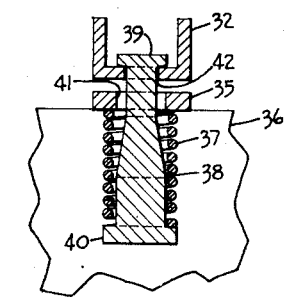
*Fig. V*
INVENTORS
Norman E. Hart
William A. Guss
BY
Marshall and Marshall
ATTORNEYS Patented Sept. 26, 1950

2,523,429

UNITED STATES PATENT OFFICE 2,523,429

STABILIZER FOR WEIGHING SCALE PIVOTAL CONNECTIONS

Norman E. Hart and William A. Guss, Toledo, Ohio, assignors to Toledo Scale Company, Toledo, Ohio, a corporation of New Jersey Application August 28, 1947, Serial No. 771,030

4 Claims. (Cl. 308—2)

This invention relates to weighing scales and in particular to mechanism for holding a V-bearing seated on a knife edge of a lever during all conditions of loading to which the lever may be subjected.

Many weighing scales intended for use in weighing commodities in retail stores employ a single lever for supporting the load receiver and a check link for maintaining the load receiver in operative position. The lever in such a scale is generally A-shaped or triangular in plan with the fulcrum pivots projecting laterally from the base of the triangular shape, with the power pivot or pivots projecting laterally from the apex of the triangular shape and with the load pivots located intermediate the fulcrum and power pivots and projecting laterally from the lever. The load receiver is supported on a spider the ends of which contain V-bearings that rest on the load pivots thus providing widely spaced points of support for the spider. The load receiver in the ordinary scale, in plan, overhangs the area occupied by the lever to such an extent that concentrated loads placed at the edge of the load receiver tend to tip the load receiver and spider and lift the opposite V-bearings from its cooperating load pivot. Under certain conditions it is also possible to tip the lever about an axis passing through one of the fulcrum pivots and power pivots so that the other fulcrum pivot lifts out of its V-bearing. If either the spider or the lever tip due to an off center concentrated load on the load receiver, the weighing scale parts are thrown out of their operative position and erroneous load indications result.

The principal object of this invention is to provide means for holding the pivots seated in their respective bearings even though a concentrated load is applied at the edge of the load receiver.

Another object of the invention is to provide a stabilizing force for maintaining the pivots of a lever seated in their respective bearings without introducing any forces that tend to influence in any way the transmission of force from the load receiver to the load counterbalancing mechanism.

An ancillary object is to provide a stabilizing mechanism that is economical to manufacture, easy to install and that is not liable to derangement once it is installed in a weighing scale.

These and other objects and advantages are attained in a weighing scale lever stabilizing means constructed according to the invention.

The improved stabilizing mechanism includes pivots mounted in the lever with their sharp edges substantially in line with the pivoting axis to be stabilized, a bar containing V-bearings resting on the pivots, and resilient means for urging the bar toward the pivots.

A preferred form of the invention is llustrated in the accompanying drawings.

In the drawings:

Figure I is a side elevation with parts broken away to show the lever system of the weighing scale.

Figure II is a vertical section through the fulcrum axis of the weighing scale lever taken substantially along the line II—II of Figure I.

Figure III is a vertical section through the load pivot axis of the lever taken substantially along the line III—III of Figure I.

Figure IV is a fragmentary vertical section of a stabilizer pivot and bearing taken along the line IV—IV of Figure II.

Figure V is a fragmentary vertical section of the resilient means for holding the stabilizer bar against the pivot, the section being taken along the line V—V of Figure II.

Figure VI is a fragmentary plan of the connection between the resilient member and the bar as seen from the line VI—VI of Figure II.

These specific figures and the accompanying description are intended merely to illustrate the invention but not to impose limitations on the claims.

The framework and housing of the improved weighing scale includes a base 1, a column 2 erected from the rear portion of the base 1, a generally cylindrical chart housing 3 surmounting the column 2 and a tiltable frame 4 mounted on the forward portion of the cylindrical housing 3 for supporting a magnifying lens carrier 5 in position such that indicia on a rotatable chart 6 may be viewed through the lenses in the carrier 5. The rotatable chart 6 is connected through a rack 7 and pinion 8 to load counterbalancing mechanism (not shown) that is contained within the column 2 and is rotated through equal angles for equal increments of weight applied to a load receiving platter 9.

The load receiving platter 9 is carried on studs 10 erected from a load spider 11 that has laterally extending arms 12 containing V-bearings 13 resting on load pivots 14 of a main lever 15. The main lever 15 includes fulcrum pivots 16 that are carried in V-bearings 17 set in the forward corners of the base 1. The main lever 15 is generally triangular in plan with the fulcrum pivots 16 located at the ends of the base of the triangle and with a power pivot 18 located at the apex of the triangular shape and in position to transmit force to the load counterbalancing mechanism.

A post 19 extending upwardly from the center of the spider 11 carries a pair of oppositely directed aligned knife edges 20 that engage V-bearings 21 of a check link 22. The other end of the the check link 22 is provided with V-bearings 23 that engage knife edges 24 mounted in an upright 25 the base of which is connected by means of adjusting screws 26 to the top of a pedestal 27 erected from the base 1. By construction the distance between the bearings 21 and 23 of the check link 22 is made accurately equal to the pivot spacing of the lever 15 and the parallelism between the check link 22 and the lever 15 is adjusted by selective tightening of the adjusting screws 26 so that the indication of load is not affected by the location of the load on the load receiver.

If loads are applied at the edge of the load receiver 9 the line of action of the load does not pass between the spaced apart load pivots 14 of the lever 15 and as a result the load receiver tends to tip about the load pivot nearest the load. This tipping action may either tip the spider 11 with respect to the lever 15 or it may tip the lever 15 with respect to the base 1. Either type of tipping is detrimental to the accuracy of load indication.

Referring to Figure II, which is a vertical section taken through the fulcrum axis of the lever, the lever 15 has fulcrum pivots 16 projecting laterally from the spaced apart arms of the lever with the pivots 16 resting in the V-bearings 17 that are set in the forward corners of the base 1. The arms of the lever 15 in the region adjacent the fulcrum pivots 16 are provided with downwardly and inwardly directed arms 28 in which threaded stems 29 are vertically mounted. The upper ends of the threaded stems 29 are sharpened to provide pivot edges 30 (see also Figure IV). Nuts 31 threaded onto the threaded stems 29 may be selectively tightened to adjust the height of the knife edges 30 to bring the knife edges into substantial alignment with the fulcrum axis defined by the knife edges of the fulcrum pivots 16. A bar 32 that is channel-shaped in cross section is provided near its ends with small self-aligning V-bearings 33 that are retained by spring tension clips 34. The bearings 33 are oriented in the bar 32 so that they may engage the upwardly directed knife edges 30 of the threaded stems 29.

The channel-shaped bar 32 is urged downwardly to maintain firm contact between the V-bearings 33 and the knife edges 30 by a resilient assembly (shown in cross section in Figure V) comprising a bracket 35 attached to a pedestal 36 of the base 1, a helical compression spring 37, and a tension member 38 on which the spring 37 is circumjacently mounted. The tension member 38 is tapered throughout its body portion and is provided with shoulders 39 and 40 at its ends. The helical compression spring 37 is compressed between the shoulder 40 and the bracket 35. The smaller end of the tapered tension member 38 that carries the shoulder 39 is inserted through a hole 41 in the bracket 35 and through the circular end of a keyhole-shaped opening 42 in the bar 32 and then engaged in the narrow end of the keyhole-shaped opening. This assembly is made before the bracket 35 is attached to the pedestal 36 so that after the bracket 35 is attached there is no possibility for registration of the hole 41 of the bracket 35 with the circular portion of the keyhole-shaped opening 42, which registration would permit derangement of the assembly. Holes drilled through the bar 32 permit access to the screws 43 that secure the bracket 35.

The force with which the helical compression springs 37 act on the bar 32 is transmitted through the bearings 33 to the knife edges 30 and thus to the lever 15 and serves as an additional load on the lever 15 to maintain its fulcrum pivots 16 in positive engagement with the fulcrum bearings 17. The force of the springs is made just sufficient to overcome the maximum upward force exerted at a fulcrum pivot by the tipping action of a concentrated load placed near the edges of the load receiver.

Referring to Figure III, which is a vertical section taken through the load pivot axis of the lever and which shows only the ends of the spider 11, the lever 15 is provided with upwardly and laterally directed ears 44 in which threaded stems 45 are vertically mounted. The lower ends of the stems 45 are sharpened to provide pivot edges 46 that, by means of threaded nuts 47, may be adjusted into substantial alignment with the knife edges of the load pivots 14. The threaded stems 45 are exact counterparts of the threaded stems 29 used at the fulcrum axis of the lever 15.

A bar 48 similar to the bar 32 is provided at its ends with V-bearings 49 that engage the knife edges 46 and is provided with keyhole-shaped slots 50 against which shoulders 51 of tapered tension members 52 are secured. Compression springs 53 act between shoulders 54 on the upper ends of the tension members 52 and the upper surfaces of the lower ends of Z-shaped brackets 55 attached to the undersurface of the spider 11. With the exception of the shape of the brackets 55 this stabilizing assembly is identical with the stabilizing assembly used at the fulcrum axis and in like manner is assembled by engaging the tension members 52 with the bar 48 before the brackets 55 are secured to the spider 11.

Each of the assemblies, whether it be at the fulcrum axis as shown in Figure II or at the load pivot axis as shown in Figure III, consists of an auxiliary pair of pivots mounted in the lever with their edges in alignment with the pivoting axis and engaging V-bearings in a bar that is resiliently held in another portion of the weighing scale. At the fulcrum axis the other portion of the weighing scale consists of the base 1. At the load pivot axis the other portion of the scale consists of the spider 11. In each assembly the helical compression springs supply a force through the bar and its V-bearings that is in addition to the load applied to the lever from the other part of the scale. This additional force is made just sufficient to overcome any tipping force that would separate the bearing and pivot of the lever.

By making the tension members 38 or 52 tapered in form and providing considerable clearance where they pass through the brackets 35 or 55 the bars 32 or 48 are allowed considerable lateral movement without frictional restraint so that any misalignment of the knife edges 30 or 46 of the threaded stems 29 or 45 respectively will not introduce any frictional restraint to the free movement of the lever 15. Any misalignment of the pivots in a horizontal direction introduces a constant force adding to or subtracting from the load forces applied to the scale and are compensated for in the initial loading of the load receiver. Any misalignment of the knife edges 30 or 46 in a vertical direction merely increases or decreases the sensitivity of the scale and is compensated for in the adjustment of the capacity of the counter-balancing mechanism of the scale.

The improved assembly is simple to manufacture and easy to adjust because the parts may be assembled as a simple sub-assembly and then attached in place in the scale by merely inserting and tightening a pair of screws. There is no precise adjustment required in the installation of the assembly and the correctness of adjustment of the positioning of the threaded stems 29 or 45 may be easily checked by observing the movement or lack of movement of the bars 32 or 48 as the lever 15 is oscillated through its travel. If the threaded stems are in perfect adjustment there is no relative movement between the bars 32 or 48 and the portions of the weighing scale to which they are resiliently attached.

Various modifications in the specific details of construction may be made without departing from the spirit and scope of the invention.

Having described the invention, we claim:

1. In a pivotal connection to a weighing scale lever, in combination, a first pair of knife edge pivots mounted in the lever, V-bearings mounted in another portion of the weighing scale and cooperating with the knife edge pivots, a pair of auxiliary pivots mounted in the lever with their edges substantially in alignment with and oppositely directed from the edges of the first pair of pivots, a bar resiliently mounted in the said other portion of the weighing scale, and V-bearings mounted in the bar and engaging the auxiliary pivots.

2. In a pivotal connection to a weighing scale lever, in combination, a first pair of knife edge pivots mounted in the lever, V-bearings mounted in another portion of the weighing scale and cooperating with the knife edge pivots, a pair of auxiliary pivots mounted in the lever with their edges in general alignment with and oppositely directed from the edges of the first pair of pivots, a bar, a pair of V-bearings mounted in the bar and cooperating with the auxiliary pivots, members connected to the bar and extending from the bar beyond the line through the knife edges, and springs acting between the ends of the members and the portion of the weighing scale for holding the V-bearings against the pivots.

3. In a pivotal connection to a weighing scale lever, in combination, a first pair of knife edge pivots mounted in the lever, V-bearings mounted in another portion of the weighing scale and cooperating with the knife edge pivots, a pair of auxiliary pivots mounted in the lever with their edges in general alignment with and oppositely directed from the edges of the first pair of pivots, a bar, a pair of V-bearings mounted in the bar and cooperating with the auxiliary pivots, brackets attached to said other portion of the weighing scale with portions of the brackets juxtaposed to the bar, shouldered members inserted through holes in the brackets and in the bar with the shoulders engaging the bar, and springs engaging the members and the brackets for holding the V-bearings against the auxiliary pivots.

4. In a pivotal connection to a weighing scale lever, in combination, a first pair of knife edge pivots mounted in the lever, V-bearings mounted in another portion of the weighing scale and cooperating with the knife edge pivots, a pair of auxiliary pivots mounted in the lever with their edges in general alignment with and oppositely directed from the edges of the first pair of pivots, a bar, a pair of V-bearings mounted in the bar and cooperating with the auxiliary pivots, brackets attached to said other portion of the weighing scale with portions of the brackets juxtaposed to the bar, said bar having keyhole-shaped slots disposed in alignment with holes in the brackets, generally tapered members shouldered at each end that are inserted through the holes in the brackets and engaged in the narrow ends of the slots, and a helical spring mounted on each tapered member and acting between a shoulder thereof and the associated bracket.

NORMAN E. HART.
WILLIAM A. GUSS.

REFERENCES CITED

The following references are of record in the file of this patent:

UNITED STATES PATENTS

| Number | Name | Date |
|---|---|---|
| 1,685,780 | Hem | Oct. 2, 1928 |
| 1,764,649 | Schaper | June 17, 1930 |
| 2,241,349 | Hem | May 6, 1941 |

FOREIGN PATENTS

| Number | Country | Date |
|---|---|---|
| 30,368 | Sweden | Dec. 24, 1909 |